United States Patent [19]
Hunt et al.

[11] Patent Number: 5,604,186
[45] Date of Patent: Feb. 18, 1997

[54] ENCAPSULATED ENZYME BREAKER AND METHOD FOR USE IN TREATING SUBTERRANEAN FORMATIONS

[75] Inventors: Charles V. Hunt; Ronald J. Powell; Michael L. Carter, all of Duncan; Samuel D. Pelley, Rush Springs; Lewis R. Norman, Duncan, all of Okla.

[73] Assignee: Halliburton Company, Duncan, Okla.

[21] Appl. No.: 388,861

[22] Filed: Feb. 15, 1995

[51] Int. Cl.$^6$ .............................. C09K 3/00; E21B 43/26; E21B 43/267
[52] U.S. Cl. .......................... 507/204; 166/300; 166/308; 427/213; 507/214; 507/921; 507/922
[58] Field of Search .................................. 507/204, 921, 507/922, 214; 166/300, 308

[56] References Cited

U.S. PATENT DOCUMENTS

| | | | |
|---|---|---|---|
| 3,163,219 | 12/1964 | Wyant et al. | 507/921 X |
| 3,766,984 | 10/1973 | Nimerick | 166/294 |
| 3,952,741 | 4/1976 | Baker | 424/405 |
| 3,992,317 | 11/1976 | Brichard et al. | 427/221 X |
| 4,182,417 | 1/1980 | McDonald et al. | 166/295 |
| 4,202,795 | 5/1980 | Burnham et al. | 252/332 |
| 4,211,668 | 7/1980 | Tate | 428/402.2 |
| 4,259,205 | 3/1981 | Murphey | 252/326 |
| 4,343,363 | 8/1982 | Norton et al. | 166/281 |
| 4,456,067 | 6/1984 | Plumer, Jr. | 166/279 |
| 4,506,734 | 3/1985 | Nolte | 166/308 |
| 4,532,123 | 7/1985 | Gardner | 428/402.21 X |
| 4,560,486 | 12/1985 | Hinkel | 507/211 |
| 4,564,070 | 1/1986 | Norton | 166/245 |
| 4,604,218 | 8/1986 | Dawson | 507/222 |
| 4,610,795 | 9/1986 | Norris et al. | 507/203 |
| 4,670,166 | 6/1987 | McDougall et al. | 507/224 |
| 4,671,972 | 6/1987 | Schobel et al. | 427/213 |
| 4,693,321 | 9/1987 | Royer | 507/902 X |
| 4,741,401 | 5/1988 | Walles et al. | 166/300 |
| 4,756,844 | 7/1988 | Walles et al. | 427/213.36 X |
| 4,770,796 | 9/1988 | Jacobs | 507/260 |
| 4,919,209 | 4/1990 | King | 166/300 |
| 4,923,753 | 5/1990 | Walles et al. | 428/402.24 |
| 5,110,486 | 5/1992 | Manalastas et al. | 507/260 |
| 5,164,099 | 11/1992 | Gupta et al. | 507/921 X |
| 5,224,544 | 7/1993 | Tjon-Joe-Pin et al. | 166/300 X |
| 5,370,184 | 12/1994 | McDougall et al. | 166/300 X |
| 5,373,901 | 12/1994 | Norman et al. | 166/300 |
| 5,437,331 | 8/1995 | Gupta et al. | 166/300 |

FOREIGN PATENT DOCUMENTS 0193369  3/1986  European Pat. Off. .

OTHER PUBLICATIONS

SPE 16900 "An Evaluation Of The Effects Of Environmental Conditions In Fracturing Fluids Upon The Long Term Conductivity Of Proppants" G. S. Penney Sep. 27–30, 1987.
SPE 16901 "Fracturing Treatment Designs Improved By Conductivity Measurements Under Insitu Conditions" M. A. Parker and B. W. McDaniel Sep. 27–30, 1987.
SPE 17541 "Accurate Design And Fracturing Refines Conductivity Measurement At Reservoir Conditions" B. W. McDaniel and M. A. Parker May 11–13, 1984.

*Primary Examiner*—Richard D. Lovering
*Attorney, Agent, or Firm*—Robert A. Kent

[57] ABSTRACT

The present invention relates to a method of preparing an encapsulated enzyme breaker and method of use in treating a subterranean formation. An encapsulated breaker is prepared by coating an enzyme on a cellulose substrate. A micron-sized particulate is admixed with the enzyme solution to prevent undesired agglomeration of the substrate. The enzyme solution coated substrate is covered with a membrane comprising a partially hydrolyzed acrylic crosslinked with either an aziridine prepolymer or a carbodiimide. The membrane contains imperfections through which an aqueous fluid may pass into the breaker to contact the enzyme and diffuse the enzyme outward from the breaker particle.

10 Claims, No Drawings

ENCAPSULATED ENZYME BREAKER AND METHOD FOR USE IN TREATING SUBTERRANEAN FORMATIONS

BACKGROUND OF THE INVENTION

The present invention relates to encapsulated enzyme breakers and methods of preparing and using such breakers in treating subterranean formations.

DESCRIPTION OF THE PRIOR ART

It is common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and applying sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Usually a gel, an emulsion or a foam, having a proppant such as sand or other particulate material suspended therein is introduced into the fracture. The proppant is deposited in the fracture and functions to hold the fracture open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows along the created fracture. Generally, a gelation agent and/or an emulsifier is used to gel or emulsify the fracturing fluid to provide the high viscosity needed to realize the maximum benefits from the fracturing process.

After the high viscosity fracturing fluid has been pumped into the formation and fracturing of the formation has occurred, it is desirable to remove the fluid from the formation to allow hydrocarbon production through the new fractures. Generally, the removal of the highly viscous fracturing is realized by "breaking" the gel or emulsion or, in other words, by converting the fracturing fluid into a low viscosity fluid. Breaking the gelled or emulsified fracturing fluid has commonly been accomplished by adding a "breaker," that is, a viscosity-reducing agent, to the fracturing fluid, however, this technique can be unreliable and sometimes results in incomplete breaking of the fluid and/or premature breaking of the fluid before the fracturing process is complete. Premature breaking can decrease the number or length of fractures obtained and thus, the amount of hydrocarbon recovery. Further, it is known in the art that most fracturing fluids will break if given enough time at an elevated temperature. However, it is, of course, most desirable to return the well back to production as quickly as possible.

It has been demonstrated that the viscosifying polymer in a fracturing fluid is concentrated by a factor of from 5 to 20 times due to fluid loss during pumping and fracture closure. This concentrated polymer generally is referred to as "filter cake." For example, see G. S. Penney, "An Evaluation Of The Effects Of Environmental Conditions In Fracturing Fluids Upon The Long Term Conductivity Of Proppants," SPE, 16900, presented at the 62nd Annual Technological Conference of SPE, Dallas, Tex., Sep. 27–30, 1987. Further, others have emphasized the effects of filter cake upon conductivity. For example, M. A. Parker and B. W. McDaniel, "Fracturing Treatment Designs Improved By Conductivity Measurements Under Insitu Conditions," SPE 16901, presented at the 62nd Annual Technological Conference of SPE, Dallas, Tex., Sep. 27–30, 1987; B. W. McDaniel and M. A. Parker, "Accurate Design And Fracturing Refines Conductivity Measurement At Reservoir Conditions," SPE 17541, presented at SPE Rocky Mountain Regional Meeting, Casper, Wyo., May 11–13, 1984. An unencapsulated breaker dissolves in the fluid and is lost along with the fluid during fluid loss. The dissolved breaker does not concentrate along with the filter cake concentration of the polymer and thus may not effectively break the filter cake. Therefore, damage to the resulting propped fracture may be permanent unless breaking subsequently occurs due to temperature degradation or dilution with formation fluids.

There have been several proposed methods for the breaking of fracturing fluids which were aimed at eliminating the above problems. For example, U.S. Pat. No. 4,202,795 discloses a method to release a chemical into an aqueous fluid by combining the chemical with a solid hydratable gelling agent and a breaker for the gel formed by the gelling agent when hydrated. The mixture is formed into prills or pellets, preferably having a size and range of from about 20 to about 40 mesh. (U.S. Sieve Series) By combining the pellets with an aqueous fluid into which the chemical is to be released, the gelling agent in the pellets hydrates and forms a protective gel around each of the pellets which prevents the release of the chemical into the aqueous fluid for the time period required for the protective gel to be broken by the gel breaker in the pellets. Once the gel breaker has broken the protective gel, the chemical in the pellets is released into the aqueous fluid. The time required for the protective gel to be broken is varied by varying the quantities of hydratable gelling agent and the gel breaker utilized in the pellets and by using different gelling agents and gel breakers.

U.S. Pat. No. 4,506,734 also provides a method for reducing the viscosity and the resulting residue of an aqueous or oil based fluid introduced into subterranean formation by introducing a viscosity-reducing chemical contained within hollow or porous, crushable and fragile beads along with a fluid, such as a hydraulic fracturing fluid, under pressure into the subterranean formation. When the fracturing fluid passes or leaks off into the formation or the fluid is removed by back flowing, the resulting fractures in the subterranean formation close and crush the beads. The crushing of the beads then releases the viscosity-reducing chemical into the fluid. This process is dependent upon the closure pressure of the formation to obtain release of the breaker and is thus, subject to varying results dependent upon the formation and its closure rate.

U.S. Pat. No. 4,741,401 discloses a method for breaking a fracturing fluid comprised of injecting into the subterranean formation a capsule comprising an enclosure member containing the breaker. The enclosure member is sufficiently permeable to at least one fluid existing in the subterranean environment or injected with the capsule such that the enclosure member is capable of rupturing upon sufficient exposure to the fluid, thereby releasing the breaker. The patent teaches that the breaker is released from the capsule by pressure generated within the enclosure member due solely to the fluid penetrating into the capsule whereby the increased pressure caused the capsule to rupture, i.e., destroys the integrity of the enclosure member, thus releasing the breaker. This method for release of the breaker would result in the release of substantially the total amount of breaker contained in the capsule at one particular point in time.

In another method to release a breaker, U.S. Pat. No. 4,770,796 teaches or suggests an acid fracturing fluid composition comprising a polymer, a crosslinking agent for said polymer, an aqueous acid and a breaker compound capable of coordinating with titanium or zirconium crosslinking agent. The breaker compound is encapsulated in a composition comprising a cellulosic material and a fatty acid and optionally a wax.

Further, U.S. Pat. No. 4,919,209 discloses a proposed method for breaking a fluid. Specifically, the patent discloses a method for breaking a gelled oil fracturing fluid for treating a subterranean formation which comprises injecting into the formation a breaker capsule comprising an enclosure member enveloping a breaker. The enclosure member is sufficiently permeable to at least one fluid existing in the formation or in the gelled oil fracturing fluid injected with the breaker capsule, such that the enclosure member is capable of dissolving or eroding off upon sufficient exposure to the fluid, thereby releasing the breaker.

U.S. Pat. No. 5,164,099 discloses a proposed method for breaking a fluid utilizing a percarbonate, perchlorate or persulfate breaker encapsulated with a polyamide. The polyamide membrane is permeable to at least one fluid in the formation which dissolves the breaker and the breaker then diffuses through the membrane to break the fracturing fluid with the membrane staying intact during the breaker release.

U.S. Pat. No. 5,373,901 discloses a method of preparing an encapsulated breaker encapsulated within a membrane comprising a partially hydrolyzed acrylic crosslinked with either an aziridine prepolymer or a carbodiimide. The membrane has imperfections through which the breaker can diffuse upon contact with an aqueous fluid. The imperfections may be created by the incorporation of selected micron-sized particles in the membrane coating.

There remains a need for a method for the controlled breaking of fracturing fluids which is more economical and provides not only controlled release of the breaker, but also reduces damage to the formation and facilitates well cleanup.

While the various methods have indicated at least some applicability to encapsulation of liquids such as enzyme breakers, various difficulties exist in the commercial production of such products. Enzyme solutions are viscous solutions which exhibit substantial tackiness when placed on a substrate or dispersed as droplets for encapsulation. This results in agglomeration of material during encapsulation and poor encapsulation coating causing inconsistent breaks when added to a viscosified fluid.

SUMMARY OF THE INVENTION

The present invention relates to a method of preparing and using an encapsulated enzyme breaker. The encapsulated breaker is capable of providing controlled release at elevated fluid pH and subterranean formation temperatures. The encapsulated breaker is enclosed within an inert membrane that is permeable to at least one fluid present in a subterranean formation or the carrier fluid introduced into a subterranean formation. The fluid permeates the encapsulated breaker and causes the enzyme to diffuse through voids in the membrane and into the fracturing fluid.

The encapsulated breaker is prepared by coating the enzyme onto a particulate cellulose, such as ground nut shells, in a fluidized bed which then is coated with an encapsulating material. The enzyme solution is admixed with a quantity of an inert micron-sized particulate prior to coating onto the cellulose substrate to obviate tackiness otherwise experienced in encapsulating the enzyme breaker.

DESCRIPTION OF THE PREFERRED EMBODIMENT

The encapsulated breaker of the present invention is made using known microencapsulation techniques. The encapsulated breaker can be made utilizing a fluidized bed process. One version of this method is referred to as the Würster process and a notification of such process utilizes a top spray method. Equipment to effect the coating is available from, for example, Glatt Air Techniques, Inc. Ramsey, N.J.

The breaker which is enclosed by the encapsulant comprises an enzyme capable of breaking a polysaccharide polymer gel. Enzymes such as hemicellulase and in particular the well known strains produced by Aspergillus niger may be utilized in the method of the present invention. The breaker is applied during the coating process to a particulate cellulose substrate that is substantially water insoluble. The particulate cellulose has a particle size in the range of 10 to 50 mesh and preferably has a particle size in the range of from about 20 to 40 mesh and most preferably from about 20 to 30 mesh on the U.S. Sieve Series. A Particularly preferred cellulose is ground nut shell or hulls and particularly ground walnut hulls. The enzyme which is utilized in the form of an aqueous solution in the present process is admixed with a quantity of a micron-sized inert particulate prior to application to the substrate. The enzyme solution is admixed with a quantity of from about 1–10 percent by weight of the solution of the inert particulate and preferably from about 2–8 percent by weight of the solution of the inert micron-sized particulate. The micro sized particulate preferably has a particle size below 15 microns and most preferably below about 10 microns. The particulate can comprise silica, talc, calcium carbonate, calcium sulfate, barium sulfate or any other inert particulate capable of disrupting the tackiness of the enzyme solution when applied to the substrate. The enzyme solution also may include from about one to about 5 percent by weight of a binder such as a partially hydrolyzed acrylic or other compound capable of increasing the adherence of the enzyme to the substrate upon removal of the aqueous in the enzyme solution.

The encapsulating material comprises a partially hydrolyzed acrylic, preferably in an aqueous based form which is crosslinked with either an aziridine prepolymer or a carbodiimide. More particularly, the term partially hydrolyzed acrylic as used herein means any of the vinyl acrylic latex polymers containing from about 0–60% by weight nonvinyl aromatic content as styrene, from about 5–25% by weight alpha, beta unsaturated carboxylic acid content and from about 15–95% by weight alkyl acrylate or methacrylate ester content. The unsaturated carboxylic acid can comprise, for example acrylic acid or methyl acrylic acid or mixtures thereof. The vinyl acrylic latex polymers are stabilized by the addition of appropriate nonionic or anionic/nonionic surfactant systems in accordance with well known methods for preparing and stabilizing latex polymer systems. Vinyl acrylic latex polymers of the type described above are commercially available from, for example, Rohm and Haas Company, Philadelphia, Pa. or S. C. Johnson Wax, Racine, Wis..

The aziridine prepolymer can comprise, for example, pentaerythritol-tris [β-(aziridinyl) propionate]. The carbodiimide can comprise, for example, 1,3-dicyclohexylcarbodiimide.

The partially hydrolyzed acrylic encapsulating material preferably is admixed with a particulate micron-sized material such as silica prior to or simultaneously with coating of the enzyme-coated substrate. The acrylic is admixed with the particulate silica in an amount such that the particulate comprises from about 0 to about 60 percent by weight of coating solids present. Preferably, the silica comprises from about 30 to about 50% by weight of coating solids present. The particulate silica can have a size range of from about 1 micron to about 15 microns. Preferably the silica has a median particle size of from about 2 to about 3 microns and preferably contains less than 33 percent, by weight, sub-micron-sized particles. The presence of substantial quantities of sub-micron-sized particles has been found to adversely effect the performance of the encapsulated breaker of the present invention resulting in unregulated release of large quantities of breaker after exposure to a fracturing fluid.

The crosslinking agent is admixed with the partially hydrolyzed acrylic and silica in an amount of from about 0.5 to about 10 percent by weight of total coating solids present. Preferably, the crosslinking agent is present in an amount of from about 2.5 to 3.5 percent by weight of total coating solids.

When utilized in a fluidized bed coating process the encapsulated breaker coating is advantageously utilized in the form of an aqueous or solvent based solution or dispersion which sometimes may be referred to as a latex which may contain from about 40 to about 55 percent by weight solids to facilitate spray coating of the breaker. Preferably the encapsulated breaker will have an encapsulant coating in an amount of from about 10 to about 40 percent by weight of the encapsulated breaker. Preferably, the coating will comprise from about 20 to about 30 percent by weight of the encapsulated breaker depending upon the rate of release desired.

As previously indicated, the encapsulated breakers are made by well known fluidized bed encapsulation techniques wherein the particles of breaker are sprayed with the encapsulant while suspended in a flow of air or other gas within a spray chamber. To maintain product uniformity with respect to performance, prior to encapsulation of the breaker material, the breaker substrate is sized to remove a substantial portion of any fines or oversized particles. In this manner, the subsequently prepared encapsulated breaker will have, within a relatively narrow range, a similar membrane coating wall thickness and exhibit generally similar breaker release control properties. Generally, the encapsulated breaker is prepared having a membrane coating of the crosslinked partially hydrolyzed acrylic and silica emulsion coating mixture of a certain thickness and permeability to obtain the desired controlled release of the breaker for a particular fracturing fluid. The quantity of and size of the particulate silica present in the sprayed coating will significantly effect the permeability of the membrane created. The size of the encapsulated breaker varies depending upon the desired amount of breaker to be released and the desired rate at which the breaker is to be released. For example, the thicker the membrane, generally the slower the release since it takes longer for the aqueous fluid in the fracturing fluid to permeate the encapsulated breaker and effect dissolution of the breaker and diffusion back through the coating. This however can be modified by changing the particle size of the silica present in the coating. Generally, it is preferred that the size of the encapsulated breaker particles should be close to or smaller than that of the proppant, if any, present in the fracturing fluid. This further minimizes any formation damage that may result from introduction of the fracturing fluid into a subterranean formation. However, it is to be understood that particles having a size larger than the proppant also may be utilized.

In the present invention, the breaker encapsulated within the coating membrane is released from within the membrane by diffusion. Fluid moves from outside the membrane through the membrane coating and into the core of the particle whereupon it contacts the breaker. The breaker solution concentration within the membrane slowly becomes greater than the breaker solution concentration outside the membrane and the breaker diffuses through the membrane and into the fracturing fluid whereupon it subsequently breaks the fracturing fluid.

The addition of the in-excess-of one micron mean diameter particles to the partially hydrolyzed acrylic coating creates imperfections in the coating in the form of small weep-holes or channels that facilitate the diffusion process. While the specific description set forth hereinabove has referred to particulate silica as the particulate additive to the coating, it is believed that any inert particulate of a similar particle size also could be utilized. The silica merely represents one commercially available preferred material. Examples of other suitable particulates would include calcium carbonate, titanium dioxide, barium sulfate and calcium sulfate or the like.

The encapsulated breaker may be used in fluids prepared by hydrating polysaccharide polymers such as guar, hydroxyalkylguar, hydroxyalkylcellulose, carboxyalkylhydroxyguar, carboxyalkylhydroxyalkylguar, derivatized cellulose and the like in an aqueous fluid. The fluid also may include a crosslinking agent. Suitable crosslinking agents include compounds such as borates, zirconates, titanates, pyroantimonates, aluminates and the like. Generally, the encapsulated enzyme breaker of the present invention can be added to any aqueous fracturing fluid generally known in the art having a pH in the range of from about 3 to about 11 and may be used at fluid temperatures of up to about 180° F.

In the practice of the present invention the encapsulated breaker can be injected with the fracturing fluid or, if added to a carrier fluid, injected into a subterranean formation prior to, simultaneously with or subsequent to injection of the gelled fluid. Generally, the encapsulated breaker will be admixed with the fluid prior to introduction into the subterranean formation. If a carrier fluid is utilized, it can comprise substantially any of the aqueous liquids utilized to form the gelled fluids.

To further illustrate the present invention, and not by way of limitation, the following example is provided.

EXAMPLE I

A series of tests are performed to evaluate the agglomeration characteristics of various substrates when encapsulated in a Versaglatt "GPCG I" fluidized bed apparatus. The unit was set up to provide top spray by insertion of a top spray insert and a three micron filter bag was utilized. The spray nozzle was placed in the lower position on the top spray insert. A 1.2 mm spray nozzle was used. The enzyme solution was applied at an average temperature of about 65° C. and the membrane was applied at an average temperature of about 40° C. An atomizing air pressure of about 2 bar and an operating pressure of about 5 bar was used in the tests. The air rate was 3–5 m/sec for the walnut hulls substrate and 5–8 m/sec for all others due to the difference in densities. The spray flow rate was 10 ml/min. After the coating agent was applied, the heat was turned off and air flow was continued for about 20 minutes while the product was cooled to room temperature. The product then was sieved to determined the amount of agglomeration based upon the percentage of material remaining on a 16 mesh screen. The results of runs with various substrates are set forth below in Table I.

TABLE I

| Test No. | Substrate | Micron Particles In Enzyme, % By Wt. | Micron Particles In Membrane | % Agglomeration |
|---|---|---|---|---|
| 1.[1] | Food Grade Salt | None | Yes | 85.9 |
| 2.[1] | Food Grade Salt | 6% | Yes | 15.3 |
| 3.[2] | Food Grade Salt | None | Yes | 81.9 |
| 4.[2] | Sugar Seeds | None | None | 9.9 |
| 5.[3] | Walnut Hulls | 6% | Yes | 2.4 |
| 6.[1] | Sugar Seeds | 10% | Yes | 25.7 |

[1] 20% encapsulant coating by weight
[2] 30% encapsulant coating by weight
[3] 35% encapsulant coating by weight The results clearly illustrate the superior production quality of the cellulose particulate, walnut hulls, in comparison to other substrates. The results also show the presence of the micron-sized particles in the enzyme solution can minimize agglomeration due to reduction of tackiness of the solution.

What is claimed is:

1. A method of breaking an aqueous fracturing fluid comprising introducing said aqueous fracturing fluid into contact with an encapsulated enzyme breaker comprising a particulate cellulose substrate having a particle size in the range of from about 10 to 50 mesh, an enzyme solution coated upon said substrate, said enzyme solution including a first micron-sized insert particulate having a particle size below about 15 microns and present in an amount of from about 1 to about 15 percent by weight of the enzyme solution and a membrane encapsulating said enzyme solution and substrate, said membrane comprising a partially hydrolyzed acrylic crosslinked with either an aziridine prepolymer or a carbodiimide and having imperfections through which an aqueous fluid can diffuse to contact said enzyme and subsequently diffuse outward from said breaker with said enzyme to contact and break the fracturing fluid in contact therewith.

2. The method of claim 1 wherein said membrane includes a second micron-sized inert material having a particle size in the range of from about 1 to about 15 microns.

3. The method of claim 1 wherein said membrane comprises from about 10 to about 40 percent by weight of the encapsulated enzyme.

4. The method of claim 1 wherein said cellulose particulate comprises ground nut shells or hulls.

5. The method of claim 1 wherein said first micron-sized particle included with said enzyme comprises at least one member selected from the group consisting of silica, talc, barium sulfate, calcium sulfate and calcium carbonate.

6. The method of claim 1 wherein said substrate is ground walnut hulls.

7. The method of claim 1 wherein said enzyme is produced by Aspergillus niger.

8. The method of claim 1 wherein said membrane includes a second micron-sized insert material having a mean particle size diameter in the range of from about 2 to about 3 microns.

9. The method of claim 8 wherein said second micron-sized particle comprises at least one member selected from the group insisting of silica, talc, barium sulfate, calcium carbonate and calcium sulfate.

10. The method of claim 8 wherein said second micron-sized particulate is silica.

* * * * *